US012796698B2

(12) United States Patent
Lacouture Correa et al.

(10) Patent No.: US 12,796,698 B2
(45) Date of Patent: Nov. 17, 2026

(54) DOUGH CONDITIONER FOR BAKED PRODUCTS AND THE LIKE, WHICH REPLACES THE FAT CONTENT THEREOF AND PROCESS FOR MANUFACTURING THE SAME

(71) Applicant: PRODIA S.A.S., Envigado (CO)

(72) Inventors: Orlando José Lacouture Correa, Envigado (CO); Juan Carlos Valencia Aguilar, Envigado (CO)

(73) Assignee: PRODIA S.A.S., Envigado (CO)

( * ) Notice: Subject to any disclaimer, the term of this patent is extended or adjusted under 35 U.S.C. 154(b) by 742 days.

(21) Appl. No.: 18/029,688

(22) PCT Filed: Oct. 5, 2020

(86) PCT No.: PCT/IB2020/059340

§ 371 (c)(1),
(2) Date: Mar. 31, 2023

(87) PCT Pub. No.: WO2022/074424

PCT Pub. Date: Apr. 14, 2022

(65) Prior Publication Data

US 2023/0270123 A1 Aug. 31, 2023

(51) Int. Cl.
*A21D 13/068* (2017.01)
*A21D 2/14* (2006.01)
(Continued)

(52) U.S. Cl.
CPC ........... *A21D 10/002* (2013.01); *A21D 2/145* (2013.01); *A21D 2/16* (2013.01); *A21D 2/181* (2013.01); *A21D 2/186* (2013.01); *A21D 13/068* (2013.01)

(58) Field of Classification Search
CPC ............................ A21D 10/002; A21D 13/068
See application file for complete search history.

(56) References Cited

U.S. PATENT DOCUMENTS 5,308,639 A * 5/1994 Fung ........................ A23L 33/21 426/566
6,582,749 B2 * 6/2003 Merrick ................. A23D 7/001 426/613
2013/0273226 A1 10/2013 Dasilva et al.

FOREIGN PATENT DOCUMENTS

BR 102015025584 A2 5/2017
BR 102015031065 A2 6/2017
(Continued)

OTHER PUBLICATIONS

"Mira-gel 463". Available online from https://www.quadragroup.store. pp. 1-4. (Year: 2025).*
(Continued)

*Primary Examiner* — Jenna A Watts
(74) *Attorney, Agent, or Firm* — Schmeiser Olsen PLLC

(57) ABSTRACT

A conditioner of doughs for baked and other bakery products, which fully or partially replaces the fat in such products is provided. Furthermore, a process of producing such a conditioner is provided. The conditioner makes it possible to strengthen the doughs, making them more tolerant to all the stresses to which they are subjected during their passage through the machines, during transport, transfers, until their arrival at the baking process or final application. By improving the behavior of the dough, gas retention is favored, making it possible to obtain products of greater volume, with a finer and more even crumb, while increasing shelf life and preventing starch retrogradation. Its appearance is similar to that of a fat (semi-solid) with the color and aroma of a lipid.

18 Claims, 4 Drawing Sheets

(51) Int. Cl.

| | |
|---|---|
| ***A21D 2/16*** | (2006.01) |
| ***A21D 2/18*** | (2006.01) |
| ***A21D 10/00*** | (2006.01) |

(56) References Cited

FOREIGN PATENT DOCUMENTS

| | | | |
|---|---|---|---|
| EP | 0441495 | A2 | 8/1991 |
| EP | 1243182 | B1 | 8/2006 |
| WO | 2010149759 | A1 | 12/2010 |

OTHER PUBLICATIONS

International Search Report for PCT/IB2020/059340 mailed on May 7, 2021.

* cited by examiner

DOUGH CONDITIONER FOR BAKED PRODUCTS AND THE LIKE, WHICH REPLACES THE FAT CONTENT THEREOF AND PROCESS FOR MANUFACTURING THE SAME

CROSS-REFERENCE TO RELATED APPLICATIONS

This application claims priority to PCT Application No. PCT/IB2020/059340, having a filing date of Oct. 5, 2020, the entire contents of which are hereby incorporated by reference.

FIELD OF TECHNOLOGY

The following refers to a dough conditioner for baked bakery products and others, which totally or partially replaces fat in the bakery products, also improving the machinability process, without adaptations of the processes, by food producers, also improving the plasticity of the finished product, the extensibility to facilitate cutting or die-cutting, and the flexibility significantly. In addition, the following refers to the manufacturing process of the dough conditioning product.

BACKGROUND

Currently, interest has been observed in developing new ingredients that allow reducing the percentage of energy derived from fat in the diet, which, in industrialized countries, ranges between 40-45%. However, from a dietary point of view, fat should provide approximately 30-35% of our energy needs, with saturated fat deriving no more than 10% of energy and daily cholesterol intake not exceeding 300 mg.

This is how the idea of replacing fats in food with low-energy ingredients arouses great scientific, industrial and consumers interest who are influenced by the media. Evidencing as direct advantages, the reduction of fat intake, the reduction of cholesterol intake and absorption, the decrease in energy intake and the increase in the intake of complex carbohydrates (in some cases).

In the state of the conventional art, fat emulators based on softener (moisturizer) and gums are known, the latter constituting the largest group, with a wide variety of ingredients: gums (xanthan, guar, tragacanth, arabic, locust bean), carrageenans, alginates, pectins. These agents are capable of providing viscosity to the product, imitating some of the textural properties of fats.

Thus, there is, for example, document EP0441495A2, which discloses a low-calorie fat substitute comprising an emulsion with a gelled aqueous phase and an oily phase. It also presents emulsions with fat extenders and fat mimetics, wherein the gel-forming composition is selected from the group consisting of agar, gelatin, pectins and carrageenan or wherein the gel-forming composition comprises: (a) a composition selected from the group consisting of alginates, xanthans, carrageenan, succinoglycans and scleroglucans; and (b) a suitable crosslinking agent; wherein it further comprises a suitable pH adjusting agent selected from the group consisting of acids selected from the group of phosphoric, acetic, lactic, fumaric, adipic, malic, tartaric, citric, hydrochloric and sulfuric acids, salts thereof; glucono delta lactone; and combinations thereof. And wherein at least a portion of the fat or oil is replaced by an incompletely digestible fat mimetic selected from the group consisting of sugar fatty acid polyesters, polyol fatty acid polyesters, polyglycerol fatty acid polyesters, fatty acid/carboxylate esters/fatty alcohol carboxylate, fatty acid esters of epoxy-extended polyols, polysiloxanes, polyoxyalkylene fatty acid esters, fatty alcohol esters of polycarboxylic acids, fatty alcohol diesters of malonic acid, alcohol diesters fatty alkylmalonic acid, dialkylmalonic acid fatty alcohol diesters, alkyl glycoside fatty acid polyesters, alpha-acylated fatty acid triglycerides, glycerol fatty alcohol dietetics, monoglyceride fatty alcohol dietetics, and glycerol esters of alpha-branched carboxylic acids.

However, this document differs from embodiments of the present invention due to the fact that embodiments of the present invention do not include fats or oils in the form of triglycerides in its formulation.

As per fat extenders, native starches make up the majority, and emulsifiers are not necessarily used. On the other hand, the process of embodiments of the present invention includes mixing stages, specific temperature ranges and vacuum application, different from the two phases mentioned in the previous document. Finally, the product of embodiments of the present invention does not require refrigeration at the post-manufacturing stage.

Another disclosure is found in document US20130273226A1, which refers to a combination of fat substitute for total or partial replacement of fat in food products such as ice cream and cake comprising: a) a carbohydrate-based fat substitute, e.g., low DE maltodextrin; b) one or more emulsifiers, for example mono- and di-glycerides and, optionally, propylene glycol monostearate; and c) one or more stabilizers, for example, carboxymethylcellulose and guar gum. Embodiments of the present invention also relate to a food product comprising the components.

However, this document differs from embodiments of the present invention due to the fact that it is a powdered product, composed mainly of low DE (dextrose equivalent) carbohydrates, among them and especially maltodextrin, while in embodiments of the present invention native corn starches are used, waxy maize and/or cassava (tapioca) and also humectants from the group of polyols such as glycerin, sorbitol and/or others are contemplated, and embodiments of the present invention do not always employ emulsifiers. Finally, the manufacturing process of embodiments of the present invention are completely different to the process used in the previous document.

On the other hand, there is the document BR102015025584A2, which discloses emulsifying powder comprising: from 10% to 60% polysaccharide; and from 5% to 40% sorbitan ester ethoxylated. Wherein the polysaccharide comprises 10% to 50% chewing gum and 10 to 60% maltodextrin, where the sorbitan ester ethoxylated is derived from a C12 to C18 chain fatty acid.

Wherein the edible gum is selected from the group consisting of gum acacia, guar gum, gum locusta, gum tragacanth, agar, carrageenan, alginate, karaya gum and xanthan gum, preferably gum acacia.

However, this document differs from embodiments of the present invention, because embodiments of the present invention disclose a dough conditioner that partially or completely replaces the fat content, preserving or improving the properties of the products in which it is used, generally without modifying the formulation thereof. Whereas, the use of the product disclosed in the previous document, an emulsifying powder, has a high content of the sorbitan ester emulsifier ethoxylated (5 to 40%), which would modify the formulations. For its part, in embodiments of the present invention, the emulsifiers could have a maximum of 10%, but in some cases, they are not even necessary.

On the other hand, there is document BR102015031065A2 that refers to fat substitute preparations applied to baked goods, cookies and the like, for example: ice cream, added and/or made of solid/saturated fat with the purpose of introducing a new way of eating and allows the consumer to eat usual products with the option of consuming less total/saturated fat and calories through humectant, body agent, emulsifier, salts of fatty acids (n4 based), mono and diglycerides of fatty acids thickening fats that have benefits to improve the health of consumers, giving industrialized food processors options to create healthier products, providing less downtime in production, 1-to-1 fat substitution and obtaining better food preparation that looks the same with an improved filling structure, compared to the taste and texture of traditional foods.

However, this document differs from embodiments of the present invention due to the fact that the applications of the products of the previous document are oriented mainly to "fillings" of bakery products, where maltodextrin is used as fat-mimicking carbohydrate, while embodiments of the present invention disclose a conditioner for especially bakeable doughs, where native starches are used. Finally, significant differences are observed in terms of the amounts of the compounds used.

Likewise, there is the document EP1243182B1 related to a method for manufacturing a flexible, strong, paper-like chocolate product, in which the sugar is dissolved in water and concentrated under continuous stirring until reaching a temperature of 115 degrees Celsius and; melted cocoa butter and/or comparable non-lauric fats are added; confectioner's sugar and mono- and diglycerides of fatty acids are added; titanium dioxide, glycerin, mono-propylene glycol and peanut oil are added; gelatin or a comparable gum product dissolved in water is added; if desired, flavoring such as vanilla is added; the substance is allowed to cool until a highly viscous mixture is obtained; after which, in a final stage of the process, the mixture is kneaded into a flexible substance, while adding molasses and corn or tapioca flour and rolling it out at room temperature to a thickness of 0.4-1.5 mm.

However, this document differs from embodiments of the present invention due to the fact that the application of the product of the previous document is oriented to the specific manufacture of confectionery or chocolate products, different from bakery products, especially those baked. It uses cocoa butter and/or non-lauric fats, also sugar, products not contemplated in embodiments of the present invention. Similarly, its production process differs significantly from embodiments of the present invention.

Finally, there is document WO2010149759, which is related to microparticles, which comprise a functional group of Docosahexaenoic acid with a low content of functional groups of saturated fatty acids and a low content of free surface fat. Embodiments of the invention further relate to the uses of those microparticles, to the manufacturing processes and to the products comprising the microparticles.

However, this document differs from embodiments of the present invention due to the fact that the application of the previous document has a special purpose in the field of Nutrition and pharmaceuticals, such as the production of microparticles (powder presentation), especially Docosahexaenoic Acid, obtained from fish oil or any other marine organism. In addition to the oil treatment and with the addition of others, it is dried using the Spray Drying technique. As seen, it greatly differs in its application or purpose, its main materials and the production method in embodiments of the present invention.

From the information disclosed in the documents of the state of the conventional art, it can be clearly seen that there is a problem for obtaining dough conditioners that replace the fats of bakery products and others, avoiding the use of maltodextrin, and avoiding the use of hydrogenated fats.

According to the above, it is clear that there is a need in the state of the conventional art to offer a conditioning product for doughs that improves the physical properties of the products where it is applied, by guaranteeing better aeration, optimization of the raw material, retarding the gelling, and reinforcing the structure of the products where it is applied, among others. Likewise, the need to provide a manufacturing process that allows obtaining the previously exposed product is observed, guaranteeing adequate hydration and a slight gelatinization of the starch.

SUMMARY

An aspect relates to a conditioner for doughs for baked goods and others, which fully or partially replaces the fat in the products. Similarly, embodiments of the present invention relate to the manufacturing process of the conditioner.

The conditioner disclosed in embodiments of the present invention makes it possible to reinforce the doughs, making them more tolerant to all the stresses they are subjected to during their passage through the machines, during transportation, transfers, until they arrive at the baking process or final application. By improving the behavior of the dough, gas retention is favored, making it possible to obtain products of greater volume, with a finer and more uniform crumb, while allowing the useful life or duration to be increased, avoiding the retrogradation of starches. Its appearance is similar to that of a fat (semi-solid) with the color and aroma of a lipid.

BRIEF DESCRIPTION

Some of the embodiments will be described in detail, with references to the following Figures, wherein like designations denote like members, wherein.

DETAILED DESCRIPTION

Figure 1:
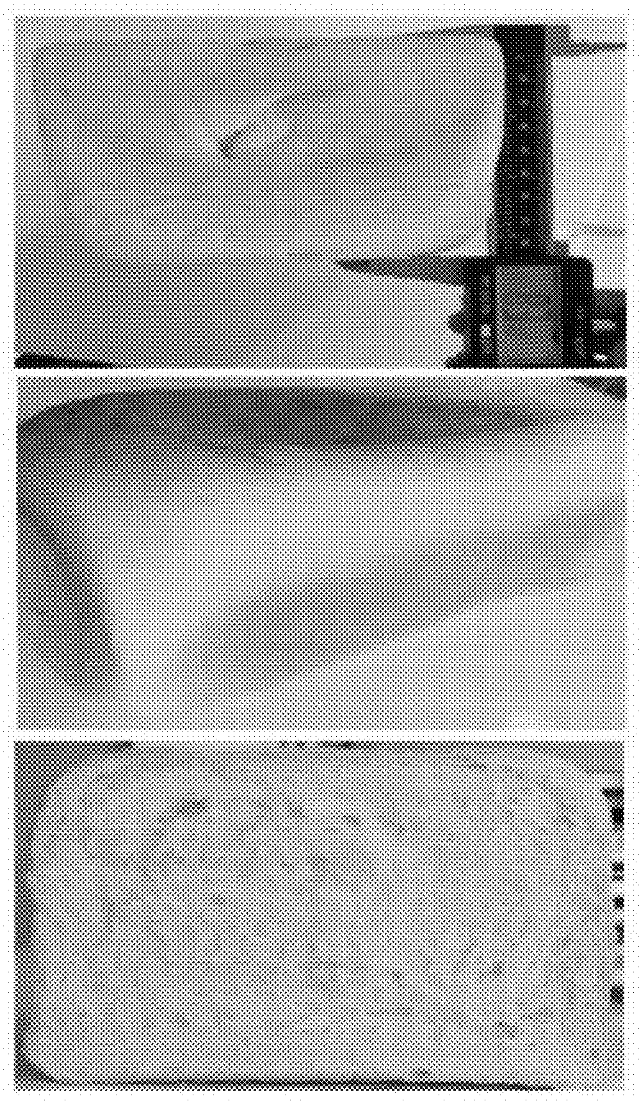
FIG. 1 shows the parameters for approval of product disclosed in embodiments of the present invention when used in bakery applications.
Figure 2:
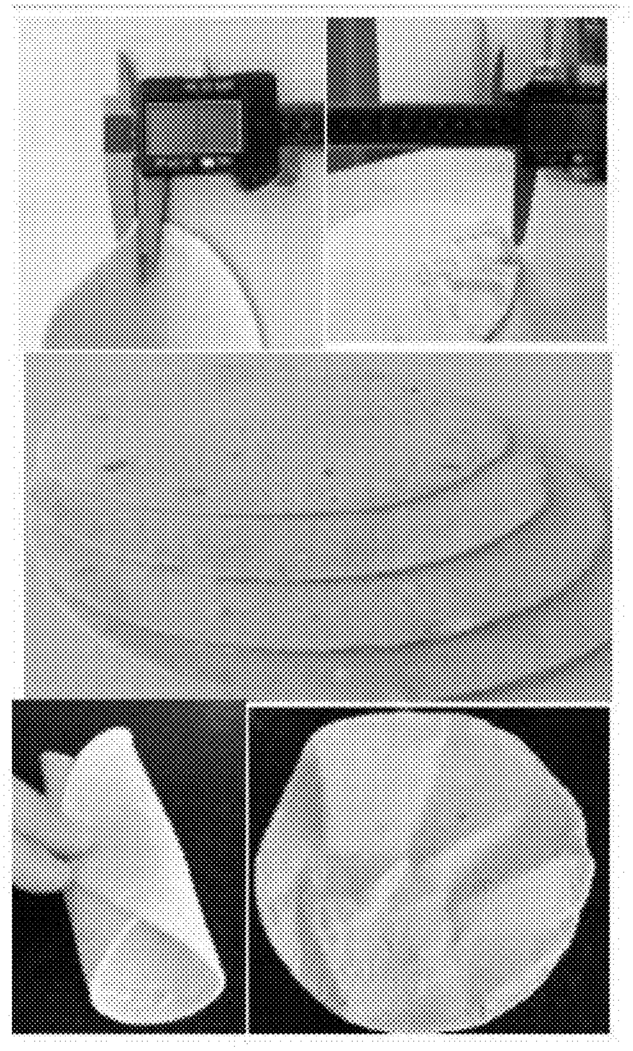
FIG. 2 shows the parameters for approval of product disclosed in embodiments of the present invention when used in tortilla applications.
Figure 3:
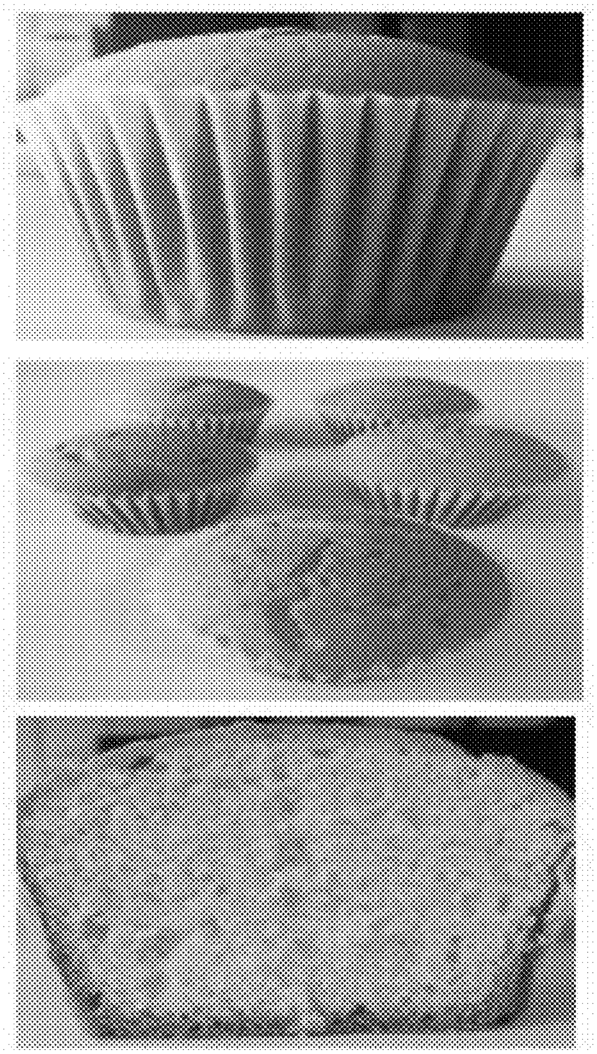
FIG. 3 shows the parameters for approval of product disclosed in embodiments of the present invention when used in confectionery or cake applications.
Figure 4:
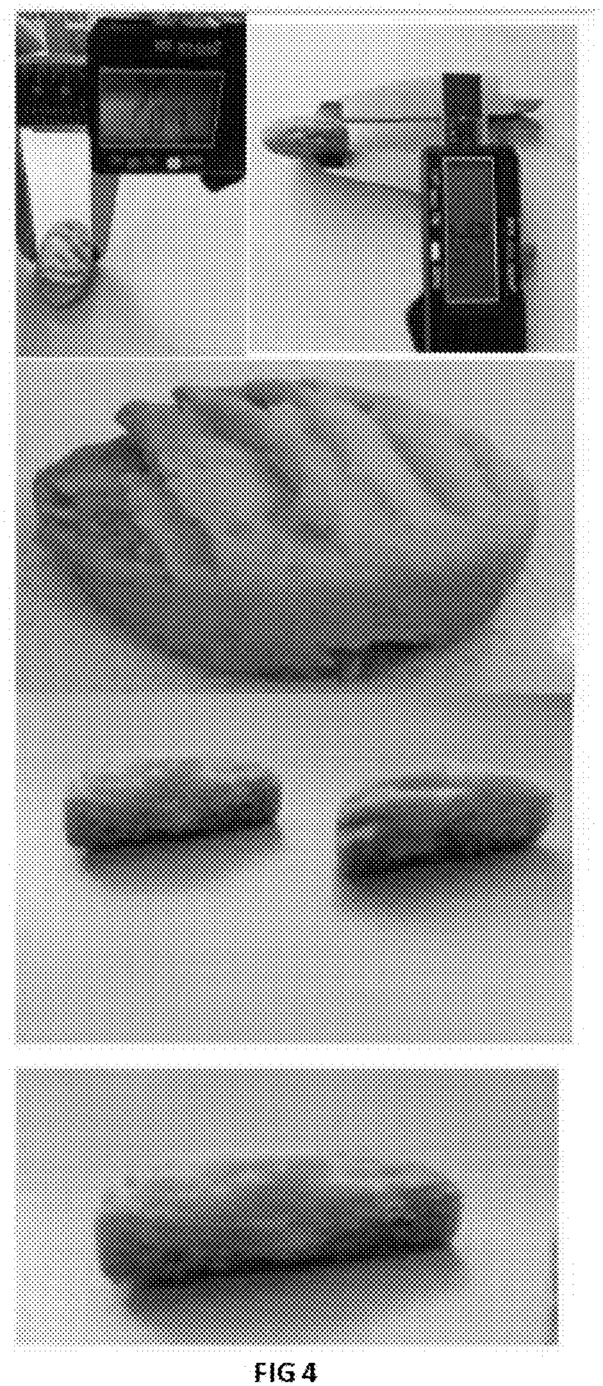
FIG. 4 shows the parameters for approval of product disclosed in embodiments of the present invention when used in cookie applications.

Embodiments of the present invention relate to a conditioner for baked goods dough, which totally or partially replaces the fat in the products. Likewise, embodiments of the present invention relate to the manufacturing process of the conditioner.

Below is a series of definitions that allow a better understanding of the scope of protection of embodiments of the present invention.

Machinability: Resistance and/or ease of use of a dough in industrial machines (punching, molding, crushing) without damaging its physicochemical properties.

Pumpable: That can be transported through pipelines.

Elasticity: Texture relative to the speed and degree of recovery after the application of a force.

Stickiness: Adhesion, especially presented in products of low and medium viscosity.

Extensibility: It is the ability of a product, in this case bakery, to be laminated, or to obtain a product in sheets (for example, without flexibility).

Flexibility: Cohesiveness in terms of the deformation property of a product (especially a laminated product), before breaking.

Gelatinization: Refers to the process in which starch and water are mixed and heated to the point where the starch absorbs the water.

Gelation: Formation of a gel from a polymer system.

Low Fat Spreads: Emulsion of fats, water and other compounds that mimic fatty products, with a lower amount of fat, generally to spread over other food.

Shortening-type fat: Fat used to soften a baked dough, avoiding hardness over time generated by proteins and carbohydrates.

Dough fatigue: Loss of extensibility of the dough due to excessive mechanical work.

Aeration: Characteristic of a dough to retain air, carbon dioxide or other gases.

Plasticity: Ability of a solid to resist deformation stress of minimum value, but to behave fluidly, like a liquid at deformation stress above the minimum value.

Embodiments of the present invention, in addition to being a partial or total substitute for fat with a reduced caloric content, generates improvements as a conditioner in the processing of dough (machinability) in the vast majority of cases without adaptations of the processes, by the food producers.

Some of these improvements are the correct plasticity of the finished products that use the conditioner disclosed in embodiments of the present invention, this property is even more evident in the applications of baked products or using heat, since it can be pumpable and is reconstituted to its original plasticity. In these cases, when applying the dough conditioner, a low "elasticity" and "stickiness" is obtained, especially in products with wheat and corn (such as arepas or corn tortillas, among others), allowing no extra work on the dough to be required, and additionally, allowing an easy "extensibility", which facilitates the work with continuous doughs for the die-cutting or partitioning process.

On the other hand, the products using the conditioner disclosed in embodiments of the present invention show a significant improvement in "flexibility" allowing their manipulation, (such as folding in the case of tortillas) and making the products less brittle, (such as the case of the arepa, a corn-based product), during its storage and cold chain.

It should be noted that one of the main differences of embodiments of the present invention compared to the state of the conventional art consists in the fact that it does not use maltodextrin or modified starches as raw material, usually soluble in the aqueous phase, as solids (body agents), which help to mimic fats, on the contrary, it uses native starches (based on corn or cassava) being incorporated into the process with a high level of shearing, obtaining an optimal distribution, together with temperature control and pressure control (vacuum), which guarantees adequate hydration and a slight gelatinization of the starch.

In this way, gelatinization is completed in the application product during the baking, roasting and/or cooking process, among others. Then there is a dual effect, with the subsequent application of heat in the preparation of the finished products. Thus, adequate plasticity is achieved, but without the stickiness of excess hydrocolloids and/or modified starches. The final plasticity is achieved in the processing of the final product, in most cases with the final gelling of the duly hydrated native starches.

On the other hand, by applying vacuum in the manufacturing process, most of the air in the product is eliminated, significantly increasing its useful life, also allowing an "expansion" or "growth" to be evident in the final product, which translates in the optimization of the raw material.

It is important to add that, to achieve adequate plasticity, the use of hydrogenated fats is NOT required (Undesirable in the vast majority of products). And in some cases, the presence of fats is dispensed with, obtaining plasticity with colloids in some cases with calcium salts as an appropriate cross-linking agent, and with duly processed native starches. In this sense, it is not possible to classify embodiments of the present invention within the products usually known as "Low Fat Spreads".

Specifically, embodiments of the present invention are characterized by presenting a conditioner for doughs, characterized by comprising emulsifiers between 0.0 and 10% by weight, humectants between 3.0 and 25% by weight, solids between 3.0 and 25% by weight, antioxidants between 0.1 and 0.2% by weight, stabilizers between 0.1 and 5% by weight, and crosslinkers between 0.0-0.5% by weight, where the percentage surplus is completed with water to obtain 100%.

Wherein the emulsifiers are selected from the group consisting of mono and diglycerides of fatty acid, glyceryl stearate, sodium lactate stearate (SSL), DATEM, CITREM. Wherein the humectants are selected from the group of glycerin, sorbitol, corn syrup or inverted sugar. Wherein the antioxidants are selected from the group of citric acid, Alpha Tocopherol and Rosemary essential oil, or sodium ascorbate. Wherein the solids are selected from the group of corn starch (native) and/or Waxy corn starch (native), Native Cassava (Tapioca) starch and wheat flour. Wherein the stabilizers can be gelatin and/or sodium alginate. Wherein the crosslinkers are selected from the group of calcium sulfate and/or calcium lactate.

Example 1

Dough conditioner characterized by comprising mono- and di-glycerides of fatty acids between 2.5 and 3.0% by weight, glycerin between 23 and 24% by weight, corn starch between 24.5 and 25% by weight, citric acid between 0.15 and 0.2% by weight, gelatin between 3.8 and 4% by weight, and calcium sulfate between 0.1-0.15% by weight, water between 44-46% to complete 100%.

The dough conditioner of embodiments of the present invention is a semi-solid, white or cream in color product of vegetable origin, and with aroma and lipid flavor.

On the other hand, embodiments of the present invention present a process for preparing the previously disclosed dough conditioner, characterized by comprising the following stages:

a) A stage of loading the liquid and solid raw materials to the mixer in a pneumatic manner;

b) A stage of heating to a temperature between 50 and 60° C.;

c) A mixing stage;

d) A stage of generating vacuum between 40 and 70 kilo-Pascals below atmospheric pressure;

e) A stage of shutting down the mixer motor;

f) A stage of unloading the product.

Wherein the process for preparing the conditioner includes a previous stage of filtering the liquid raw material and sieving the solid raw material.

The steps described in items a), b), c), and d) can be carried out sequentially or simultaneously.

Where the loading of raw materials is pneumatically.

Wherein the mixing stage c) comprises three mixing substages; a Mixing Substage i) being carried out with an anchor-type mixer at a speed between 20 and 35 rpm, for a period of time between 40 and 180 minutes; a mixing substage ii) being carried out with a blade-type mixer at a speed between 20 and 45 rpm, for a period of time between 40 and 180 minutes; a mixing substage iii) being carried out with a turbine at a speed between 1500 and 3000 rpm, for a period of time between 40 and 150 minutes.

In an embodiment, the heating stage lasts between 40 and 180 minutes.

In an embodiment, the vacuum generation stage lasts up to 150 min (2 h30), and reaches a vacuum pressure of 70 kilo-Pascals below atmospheric pressure.

Wherein the process for preparing the conditioner also includes a final stage of packaging the product.

Example 2

In an embodiment, the previously disclosed process for preparing the dough conditioner is characterized by comprising the following steps:

a) A stage of loading the liquid and solid raw materials to the mixer in a pneumatic manner;

b) A stage of heating to a temperature between 50 and 60° C.;

c) A mixing stage;

d) A stage of generating vacuum between 40 and 60 kilo-Pascals below atmospheric pressure;

e) A stage of shutting down the mixer motor;

f) A stage of unloading the product.

Wherein the process for preparing the conditioner includes a previous stage of filtering the liquid raw material and sieving the solid raw material.

Wherein the stages described in items a), b), c), and d) are carried out simultaneously.

Where the loading of raw materials is performed pneumatically.

Wherein the mixing stage c) comprises three mixing substages; a Mixing Substage i) being carried out with an anchor-type mixer at a speed between 25 and 27 rpm, for a period of time between 40 and 180 minutes; a mixing substage ii) being carried out with a blade-type mixer at a speed between 30 and 40 rpm, for a period of time between 40 and 180 minutes; a mixing substage iii) being carried out with a turbine at a speed between 2600 and 2800 rpm, for a period of time between 40 and 150 minutes.

In an embodiment, the heating stage lasts between 40 and 150 minutes.

In an embodiment, the vacuum generation step lasts up to 150 min, and reaches a vacuum pressure of 60 kilo-Pascals below atmospheric pressure.

Wherein the process for preparing the conditioner also includes a final stage of packaging the product.

In this way, it is evident that the main advantages obtained by this product are:

Substitute fat, achieving a reduction in saturated fats in the applied products.

Improve the useful life of finished products, allowing a reduction in the use of chemical preservatives.

Provide greater plasticity and flexibility (elasticity) to the application product.

Improve the stability in the structure of foods (baked products, fatty fillings, creams in baking, biscuits, tortillas, pastries, cakes).

Provide softness.

Greater product aeration.

Obtaining whiter or lighter and more flexible crumbs or mixtures, with finer and more uniform alveolates.

Improve the cutting or portioning of the products.

Volume contribution in some specific products (bakery among others).

Improve the nutritional table by reducing saturated fats.

Improvements in skins in the products (color).

In corn and wheat products, it helps with lubrication, avoiding breakage or rupture when subjected to frying or freezing.

Texture Improver.

Prevents retrogradation of starch.

Does not contain triglycerides.

Reduces mass fatigue.

In general, it improves the physical properties of cooked products. For all of them, an increase in the volume of the product is always observed, which is sustained by: An improvement in air capture during kneading; A reinforcement of the gluten mesh that allows better retention of fermentation gases; A delay in gelling, prolonging the time in which the paste remains deformable and favoring its expansion.

For its part, the advantages of the manufacturing or preparation process are:

Prevention and/or control of gelatinization of the product, reaching the desired plasticity and/or leaving the possibility of gelation in the final food shaping process, emulating a shortening type fat.

Air extraction, which achieves a more compact shape of the product, ensuring greater plasticity and greater stability, also allowing aeration of the products during shake.

Optimal homogenization and dispersion conditions are achieved, required to increase the stability of the product, allowing the simulation of a fat with an "adequate amount of total solids", at temperatures of 60° C., difficult to achieve by Low Fat Spreads.

The main applications for embodiments of the present invention, without limiting, are:

Bakery.

Tortillas.

Soda Type Cracker Biscuits.

Fillings in cookies and desserts.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A dough conditioner, comprising:

emulsifiers between 0.0 and 10% by weight, humectants between 3.0 and 25% by weight, solids between 3.0 and 25% by weight,
antioxidants between 0.1 and 0.2% by weight,
stabilizers between 0.1 and 5% by weight, and
crosslinkers between 0.0-0.5% by weight;
wherein the dough conditioner does not include fats or oils in a form of triglycerides.

2. The dough conditioner of claim 1, wherein the emulsifiers are selected from the group of mono and diglycerides of fatty acid, glyceryl stearate, sodium lactate stearate, DATEM, and CITREM.

3. The dough conditioner of claim 1, wherein the humectants are selected from the group of glycerin, sorbitol, corn syrup, or inverted sugar.

4. The dough conditioner of claim 1, wherein the antioxidants are selected from the group of citric acid, Alpha Tocopherol and Rosemary essential oil, or sodium ascorbate.

5. The dough conditioner of claim 1, wherein the solids are selected from the group of native corn starch, and/or native Waxy corn starch, native Cassava starch, and wheat flour.

6. The dough conditioner of claim 1, wherein the stabilizers are gelatin and/or sodium alginate.

7. The dough conditioner of claim 1, wherein the crosslinkers agents are selected from the group of calcium sulfate and/or calcium lactate.

8. The dough conditioner according to claim 1, further comprising mono- and di-glycerides of fatty acids between 0.1 and 10% by weight, glycerin between 3.0 and 25% by weight, corn starch between 3.0 and 25% by weight, citric acid between 0.1 and 0.2% by weight, gelatin between 0.1 and 5% by weight, and calcium sulfate between 0.0-0.5% by weight.

9. The dough conditioner according to claim 1, wherein the dough conditioner is a product of plant origin, semi-solid, white or cream in color, and with aroma and lipid flavor.

10. A process for preparing a dough conditioner comprising:

a. a stage of loading raw materials to a mixer in a pneumatic way;
b. a heating stage;
c. a mixing stage;
d. a vacuum generation stage;
e. a stage of shutting down of a mixer motor; and
f. a stage of unloading the dough conditioner, which comprises: emulsifiers between 0.0 and 10% by weight, humectants between 3.0 and 25% by weight, solids between 3.0 and 25% by weight, antioxidants between 0.1 and 0.2% by weight, stabilizers between 0.1 and 5% by weight, and crosslinkers between 0.0-0.5% by weight, wherein the dough conditioner does not include fats or oils in a form of triglycerides.

11. The process for preparing the dough conditioner according to claim 10, further comprising including a previous stage of filtering a liquid raw material and sieving a solid raw material.

12. The process for preparing the dough conditioner according to claim 10, wherein the stage of loading of raw materials is carried out pneumatically.

13. The process for preparing the dough conditioner according to claim 10, wherein the heating stage lasts between 40 and 180 minutes.

14. The process for preparing the dough conditioner according to claim 10, wherein the vacuum generation stage reaches a vacuum pressure between 40 and 70 kilo-Pascals below atmospheric pressure.

15. The process for preparing the dough conditioner according to claim 10, further including a final stage of packaging a product.

16. The process for preparing the dough conditioner according to claim 10, wherein the mixing stage comprises three mixing sub-steps; a mixing substage i) that is carried out with an anchor-type mixer at a speed between 20 and 35 rpm, for a period of time between 40 and 180 minutes; a mixing substage ii) that is carried out with a blade-type mixer at a speed between 20 and 45 rpm, for a period of time between 40 and 180 minutes; a mixing substage iii) that is carried out with a turbine at a speed between 1500 and 3000 rpm, for a period of time between 40 and 150 minutes.

17. A method comprising:
utilizing the dough conditioner according to claim 1 in a preparation of products for human or animal consumption by ingestion.

18. The method according to claim 17, wherein the products include baked goods, tortillas, soda cookies, cookie fillings and desserts.

* * * * *